United States Patent
Apel et al.

(10) Patent No.: US 6,380,733 B1
(45) Date of Patent: Apr. 30, 2002

(54) LATCHED SWITCHING DEVICE

(75) Inventors: Peter Apel, Suedkirchen; Klaus Fallak, Werne, both of (DE)

(73) Assignee: AB Elektronik GmbH, Werne (DE)

( * ) Notice: Subject to any disclaimer, the term of this patent is extended or adjusted under 35 U.S.C. 154(b) by 0 days.

(21) Appl. No.: 09/125,123

(22) PCT Filed: Dec. 11, 1997

(86) PCT No.: PCT/EP97/06909

§ 371 Date: Aug. 11, 1998

§ 102(e) Date: Aug. 11, 1998

(87) PCT Pub. No.: WO98/26341

PCT Pub. Date: Jun. 18, 1998

(30) Foreign Application Priority Data

Dec. 11, 1996 (DE) ......................................... 196 51 315

(51) Int. Cl.$^7$ ................................................. G01B 7/30
(52) U.S. Cl. ................... 324/207.2; 335/205; 335/207; 335/107; 335/170; 335/186; 74/10.41; 324/207.25
(58) Field of Search ......................... 324/207.2, 207.25, 324/207.23, 207.24; 335/106, 107, 114, 122, 125, 136, 170, 177, 180, 186, 203, 205, 206, 207; 248/913; 74/10.1, 10.15, 10.2, 10.22, 10.27, 10.41, 10.52, 10.54, 10.9, 10.45

(56) References Cited

U.S. PATENT DOCUMENTS

| | | | | |
|---|---|---|---|---|
| 2,611,843 A | * | 9/1952 | Bourne | .................. 200/87 |
| 4,628,199 A | * | 12/1986 | Mueller et al. | .............. 250/229 |
| 4,748,441 A | * | 5/1988 | Brzezinski | .................. 340/709 |
| 5,612,521 A | * | 3/1997 | Bistekos | .................. 200/16 R |

FOREIGN PATENT DOCUMENTS

| | | |
|---|---|---|
| DE | 3138827 | 4/1983 |
| DE | 19503615 | 8/1995 |

OTHER PUBLICATIONS

S. Hildebrand, Feinemechanische Bauelements, Munich, Carl Hanser, Publishers, 1972, pp. 676–686.

* cited by examiner

*Primary Examiner*—Jay Patidar
(74) *Attorney, Agent, or Firm*—Milde & Hoffberg, LLP

(57) ABSTRACT

So that a device for producing selector positions is easy to operate, the stop positions of which can be taken in securely and largely free of mechanical wear, and so that it is easily adaptable, in particular to the respective operating conditions, a position transmitter unit (1) is provided which is movable along a longitudinal axis, and thereby its position transmitter teeth can be fixed with respect to the teeth of a first position detector element (6.1., . . . 6.n). The position transmitter unit (1) can be shifted with a finger body along the longitudinal axis into a recess, and thereby a second rotation body can be placed on a second position selector unit, and this position can be detected by a second position detector element (57). The position transmitter unit (1) can be moved with a moving device (32.1, . . . 32.n) via a second position selector unit two dimensionally with respect to a base body (4), and this position can be detected by third position detector elements (8.1).

17 Claims, 11 Drawing Sheets

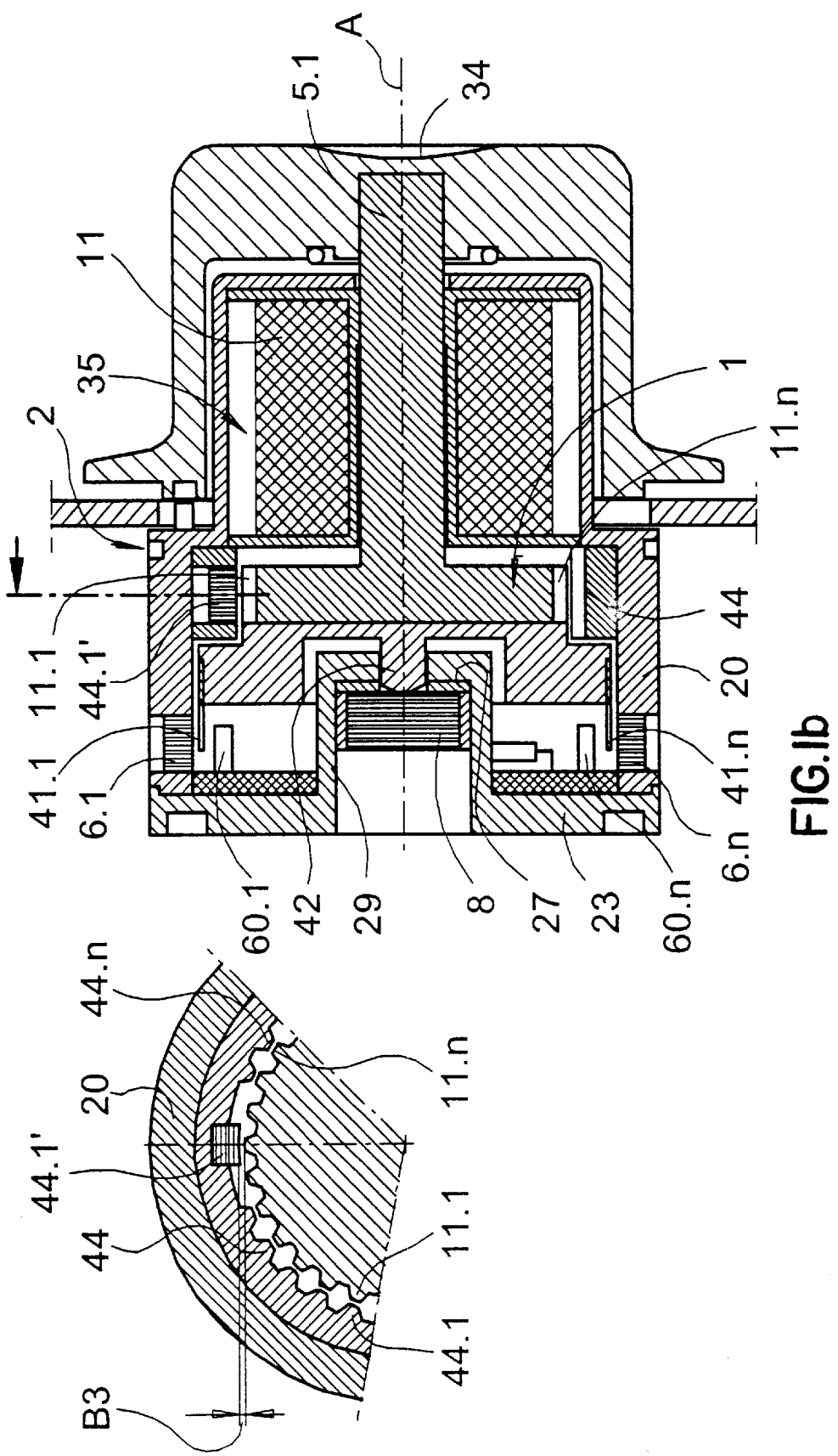

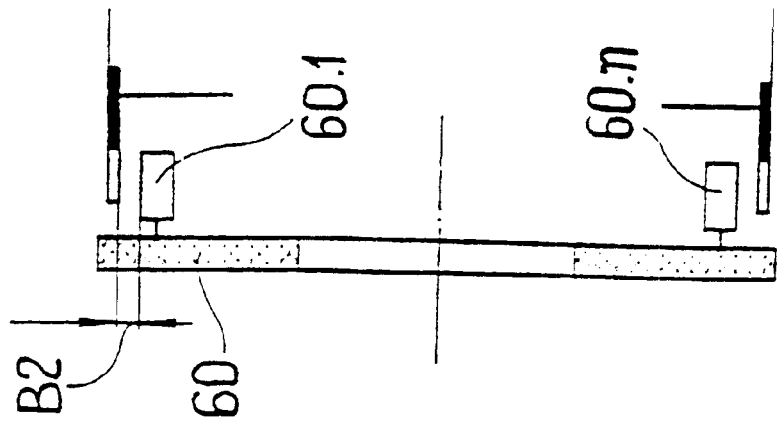
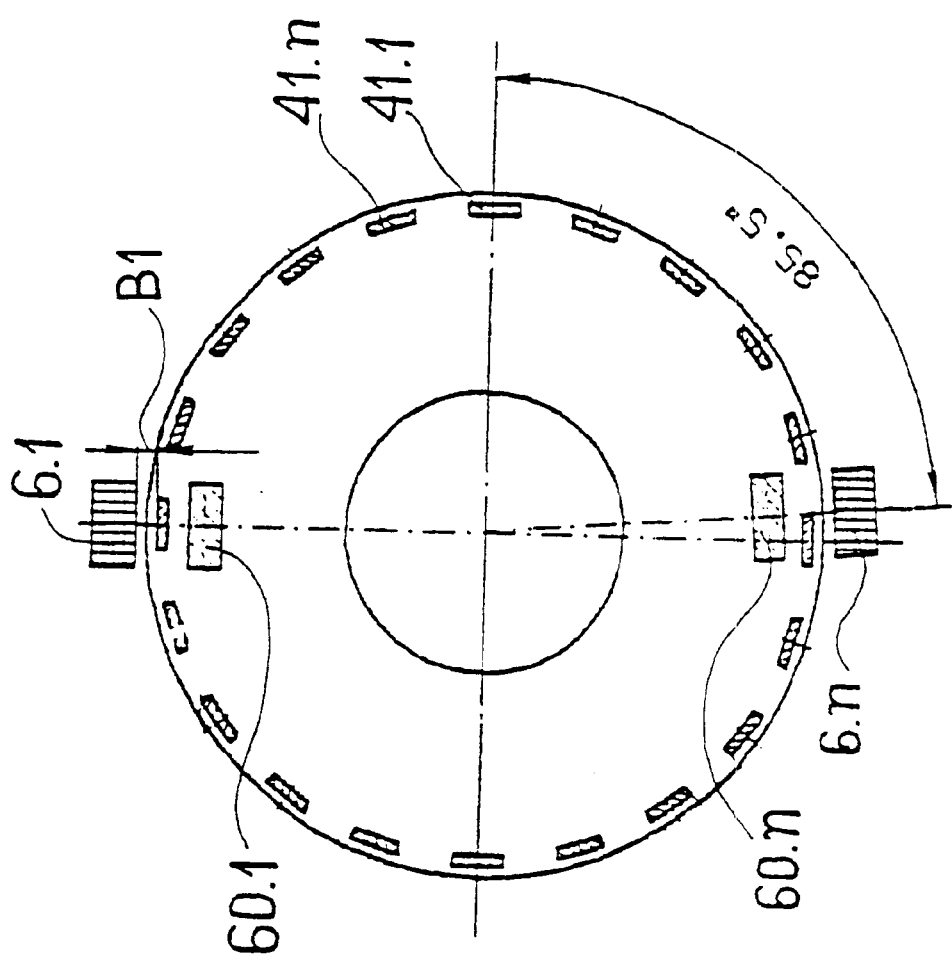

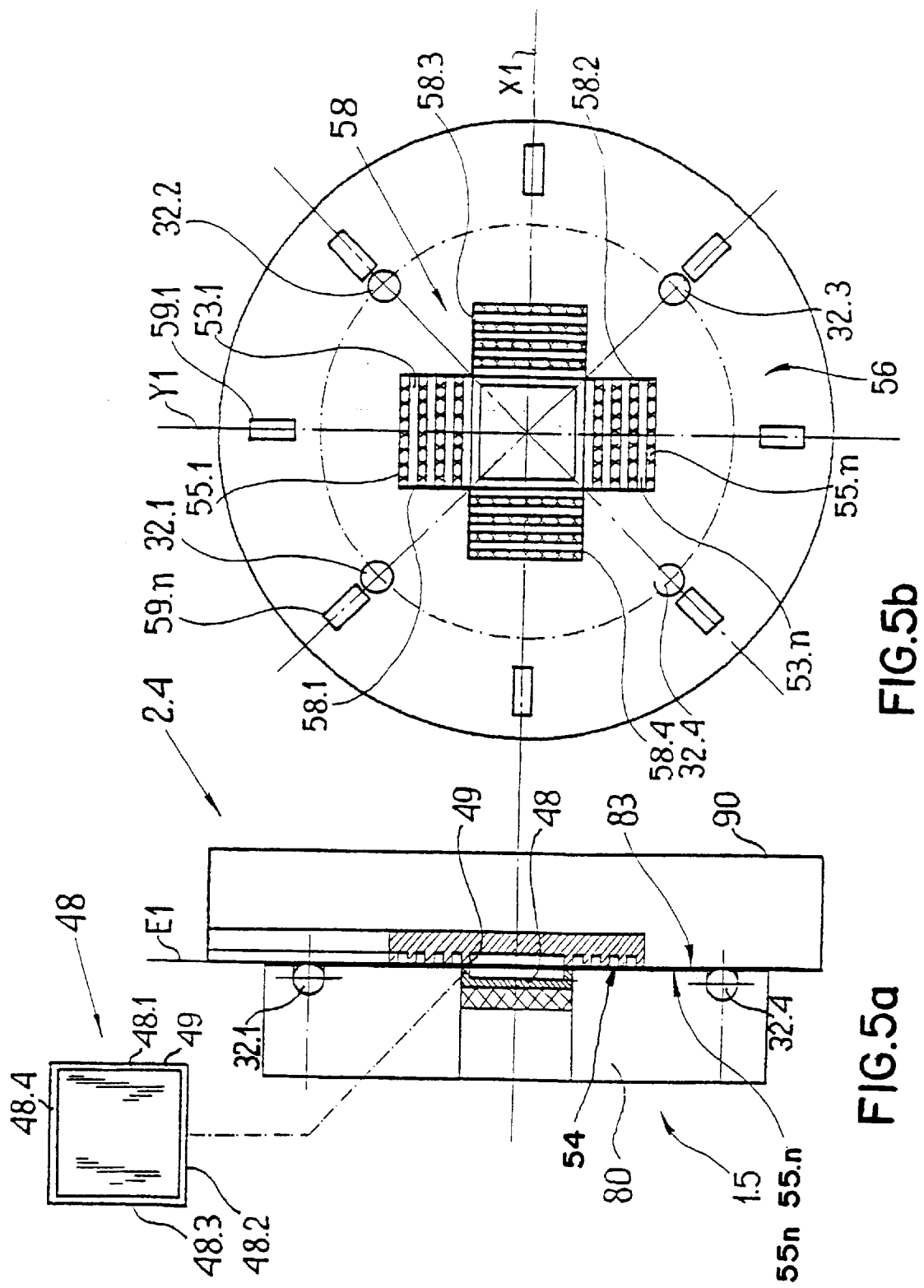

LATCHED SWITCHING DEVICE

BACKGROUND OF THE INVENTION

The present invention concerns a discontinuous state selector. It is intended in particular for operating in-vehicle computers, washing machines, bicycle derailleurs, etc., personal computers, computer games, navigational systems etc., or other types of consumer and operating equipment.

S. Hildebrand, *Feinmechanische Bauelemente*, Carl Hanser, Publishers, Munich 1972, pages 676 to 686, discloses various detent mechanisms employed to establish and maintain a mechanical device in a preferred state. They are primarily threshold-force mechanisms. There are neutral segments between the various settings, within which the mechanisms are inoperative. The mechanisms must always be forced against the mechanical device by an auxiliary force. The components themselves are rotating disks engaged by a pawl. The pawl can have a simple lever and neutral intermediate states, a cylinder, a spring, a double ratchet that releases a shaft, a square bolt, or axial notches.

Generally, the transition from the locked to the unlocked state and vice versa is particularly important. Various forces must be accounted for that can be detrimental over the long run with respect to wear and accordingly to the life of the mechanism.

Also disclosed is a magnetic detent mechanism, with a cogwheel that rotates around a shaft. Extending out of the shaft and facing the wheel are two cog-like pins fastened to a magnet. The magnet has a certain remote action that can penetrate the walls of non-magnetic materials.

The German Patent Publication No. A 3,138,827 discloses a gear selector whereby the state of a lever is communicated remotely by magnetic sensors in conjunction with a magnet on the lever. There is either one sensor for each state of the lever or less sensors than gear states, with the state of the lever represented by a combination sensors or by a code.

The drawback here is that the selector can be employed only to detect the state of the lever in a gearshift.

The Patent Publication No. German A 19 503 615 discloses a device for two-dimensional control or measurement. It includes a pivoting "club" comprising a rod and a ball and socket. The ball rotates freely in the socket. A magnet on the club actuates Hall sensors. This arrangement provides a joystick for use with computers.

Contemporary automobiles usually have built-in computers. Knobs can be pressed on the window-wiper lever or driving control to call up current time, outside temperature plus icy-road signals, average and current gasoline consumption, current gasoline-tank level, mileage remaining until next fill-up, and stopwatch all displayed on the instrument panel. Radio-broadcasting stations can also be selected on one side of the steering wheel and their volume adjusted on the other side.

The drawback here is that three separate sets of knobs must be operated individually, which can distract the driver to the detriment of steering. This situation increase the risk of accidents.

SUMMARY OF THE INVENTION

The object of the present invention is accordingly to provide a state selector, especially for in-vehicle computers, washing-machine controls, bicycle gears, etc. that will be easy to use, with states that can be extensively selected without wear, and that can be readily adapted to various applications.

This object, as well as other objects which will become apparent from the discussion that follows, are achieved, in accordance with the invention, by a state selector comprising a state-transmitting assembly, a state-selecting assembly and a state-indicating assembly as described below.

The state-selecting assembly "snaps" into the state-transmitting assembly magnetically and operates without wear. The state-selecting assembly can move with respect to the state-transmitting assembly in any desired direction, preventing damage to or destruction of the click-in controls. The design of the state-transmitting and state-selecting assemblies allows further miniaturization of the click-in controls. The miniaturization allows the device to be installed in the restricted space that occurs in particular in the cockpits of vehicles and aircraft but also inside washing machines. The states are polled without being either contacted or disturbed and are available in the form of electrical signals for further processing.

In a particular, preferred embodiment of the invention, the adjustability of the click-in controls obtained by rotation is augmented by a touching motion, confirming the states assumed in rotation. This confirming motion is also polled without contact or disturbance and is available in the form of electrical signals for further processing.

In another, particular preferred embodiment of the invention, the selection states are augmented by further adjustments in two dimensions. These states are polled without being either contacted or disturbed and are available in the form of electrical signals for further processing.

Still another embodiment of the invention is intended to imitate the handy computer mouse. States can be changed in two dimensions as when controlling the motion of a cursor on a computer screen. The rotation around the axis of the state-transmitting assembly allows different programs to be called up. The magnetic finger-touch switching motion along the axis of the state-transmitting assembly can be employed to call up various data or components thereof. The more convenient embodiment described initially above can be employed to great advantage by the blind. The sensitivity with which the states can be changed by rotation around the axis of the state-transmitting assembly, by the touching motion in the direction of the axis, and the displacement between two planes allows states to be selected and confirmed without looking at them.

In still another embodiment, the rotation around the axis of the state-transmitting assembly is augmented by a joystick-like function. The states can again be polled without being either contacted or disturbed and are available in the form of electrical signals for further processing.

In still another embodiment, both the rotation and the finger-touch motion of the state-transmitting assembly are augmented by corresponding signals emitted in accordance with the joystick-like function mentioned above. This convenient embodiment is particularly appropriate for use with personal computers for the blind in that all the limiting states can be selected and confirmed during operation without looking at them.

For a full understanding of the present invention, reference should now be made to the following detailed description of the preferred embodiments of the invention as illustrated in the accompanying drawings.

BRIEF DESCRIPTION OF THE DRAWINGS

FIGS. 1a through 1d are longitudinal sections through various modular embodiments of a latched switching device.

FIG. 2 is a section along the line II—II through the switching device illustrated in FIG. 1a.

FIGS. 3*a* and 3*b* are sections through the device of FIG. 1*c* taken along the line I—I.

FIG. 5*a* illustrates a base for the latched switching device illustrated in FIG. 1*a*.

FIG. 5*b* is a top view of the base illustrated in FIG. 5*a*.

DESCRIPTION OF THE PREFERRED EMBODIMENT

Figure 1A:
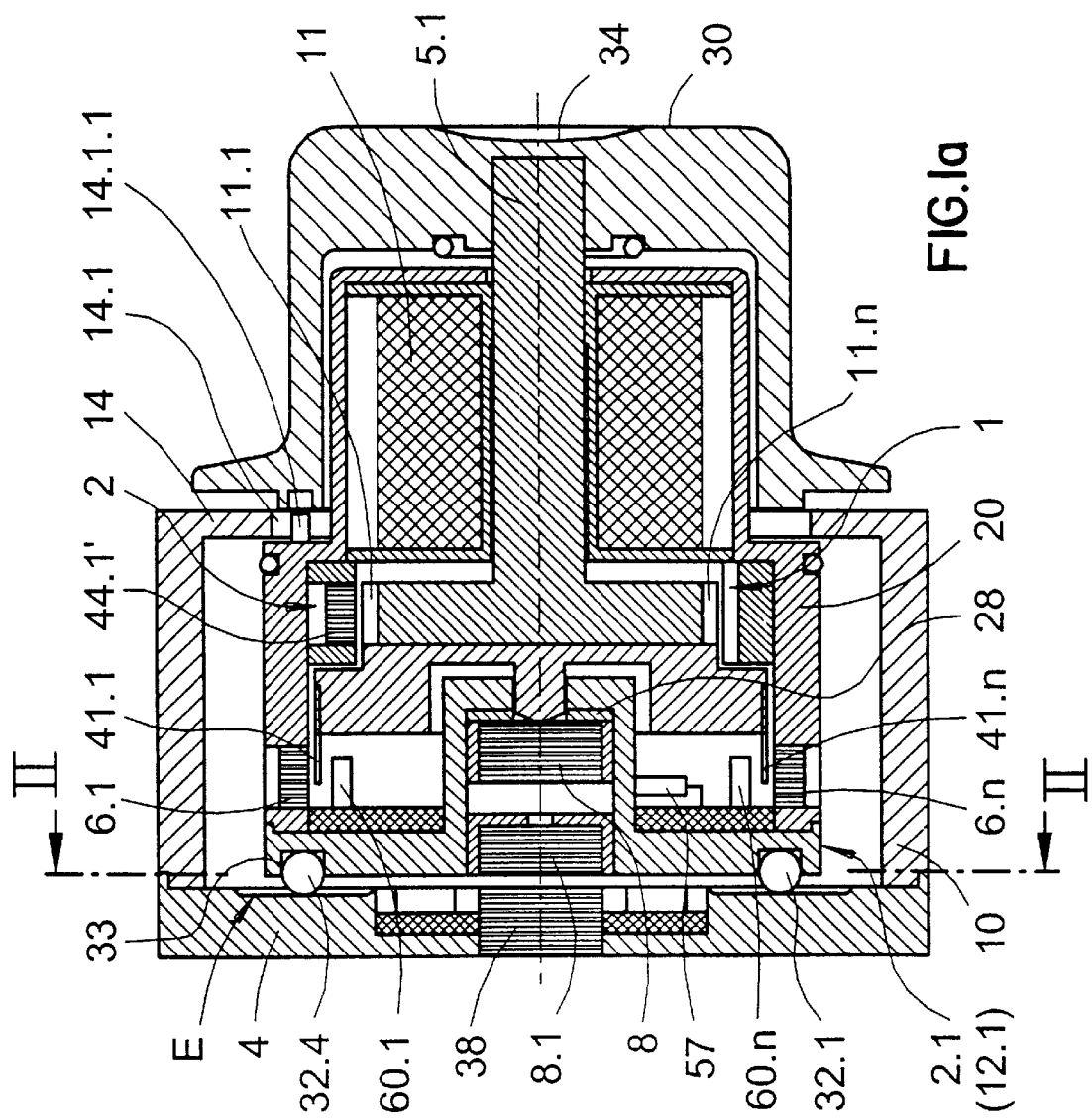
Figure 1C:
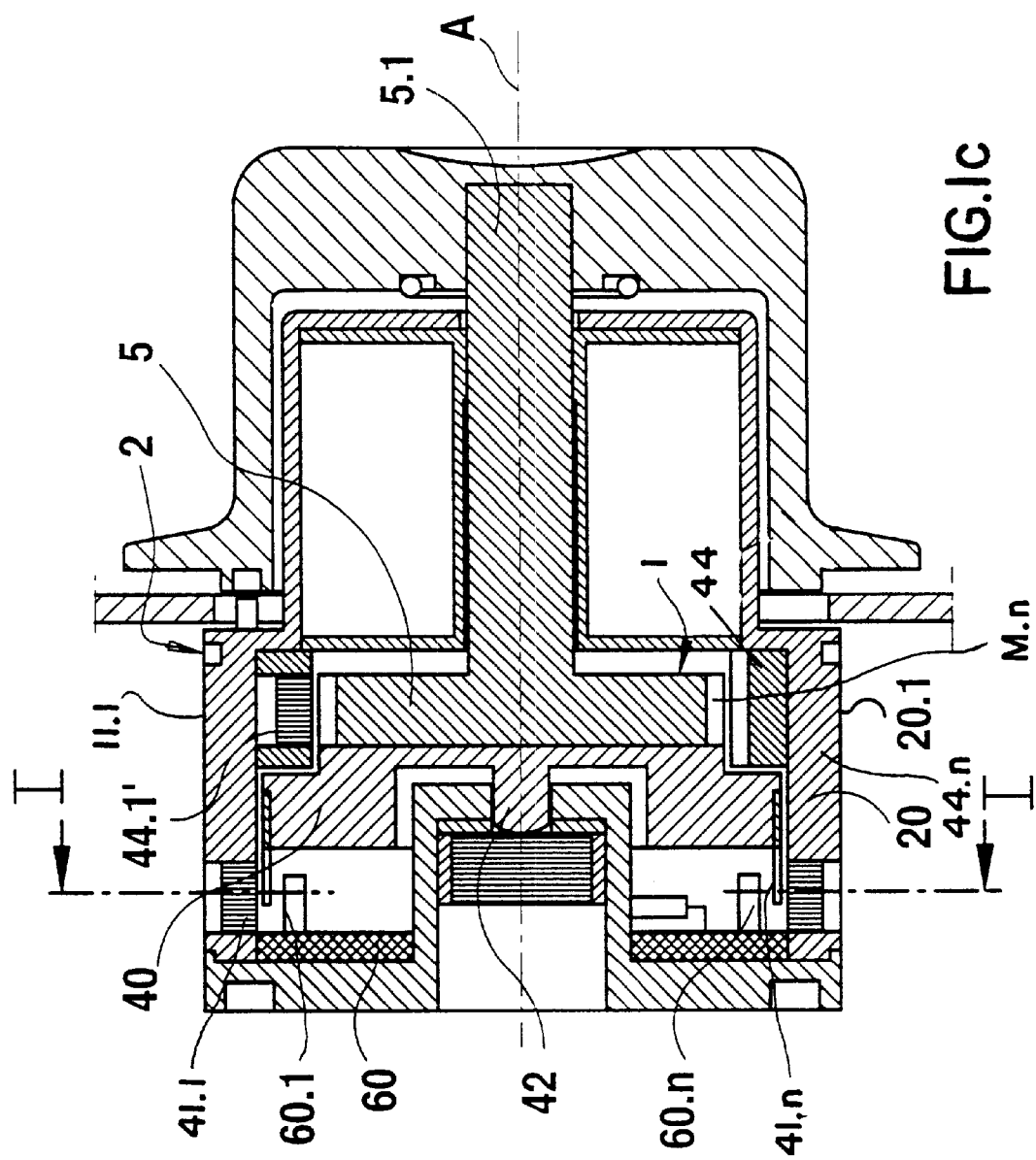

FIGS. 1*a*, 1*b*, and 1*c* illustrate a modular discontinuous state selector ("click-in controls" hereinafter). It is intended in particular for operating in-vehicle computers, washing machines, etc.

FIG. 1*c* illustrates the simplest form of the latched switching device. It includes a position-information, state-transmitting assembly 1 in the form of a cylindrical rotor 5 with an integrated shaft 5.1. Rotors has radial state-transmitting cogs 11.1, ..., 11.n distributed around it. The cogs are trapezoidal and separated by matching state-transmitting gaps (not shown in FIG. 1*c*). The total assembly accordingly constitutes a pulse generator.

Also in FIG. 1*c*, rotor 5 is fastened to another rotor 40 with a larger outside diameter, and mounted on rotor 40 are state-information transmitting components 41.1, ..., 41.n in the form of metal tabs separated by equally wide gaps.

Surrounding position-information, state-transmitting assembly 1 is a position selecting assembly 2. The pulse generator—that is, rotor 5 and its state-transmitting cogs 11.1, ..., 11.n,—is surrounded by a crown wheel 44 secured to the cylindrical surface 20.1 of an inner housing 20. The inner surface of crown wheel 44 has at least one radially inward-projecting cog (FIG. 1*b*). The identically shaped cogs are separated by matching gaps.

Also in FIG. 1*c*, crown wheel 44 accommodates at least to some extent equally distributed permanently magnetized components 44.1'.

Crown wheel 44 is held in and secured by a stationary inner housing 20. As shown in FIG. 1*b*, the state-information transmitting cogs 11.1, ..., 11.n on rotor 5 and the permanently magnetized, radially inward projecting cogs 44.1, ..., 44.n on crown wheel 44 are separated by an interval B3.

In FIG. 1*a*, inner housing 20 accommodates and holds a coil 11 that faces rotor 5 and its integrated shaft 5.1. Coil 11 magnetizes state-information transmitting cogs 11.1, ..., 11.n (shown in FIG. 10), each of which will accordingly behave as an individual magnet.

Figure 4B:
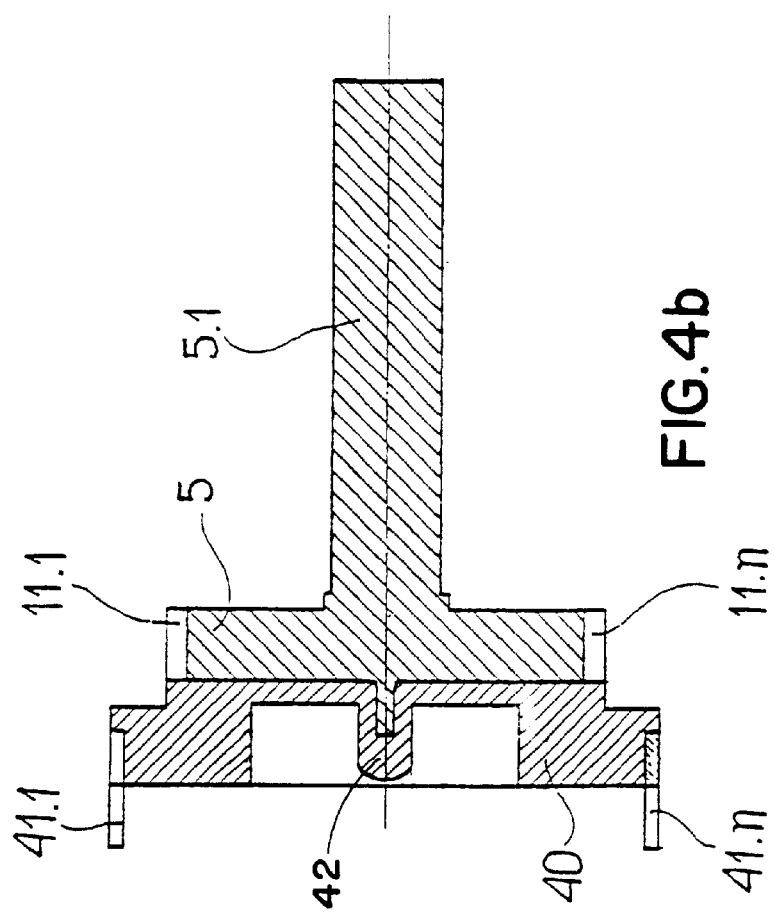
FIG. 4*b* is a schematic longitudinal section through the state-transmitting assembly illustrated in FIG. 4*a*.
Figure 4A:
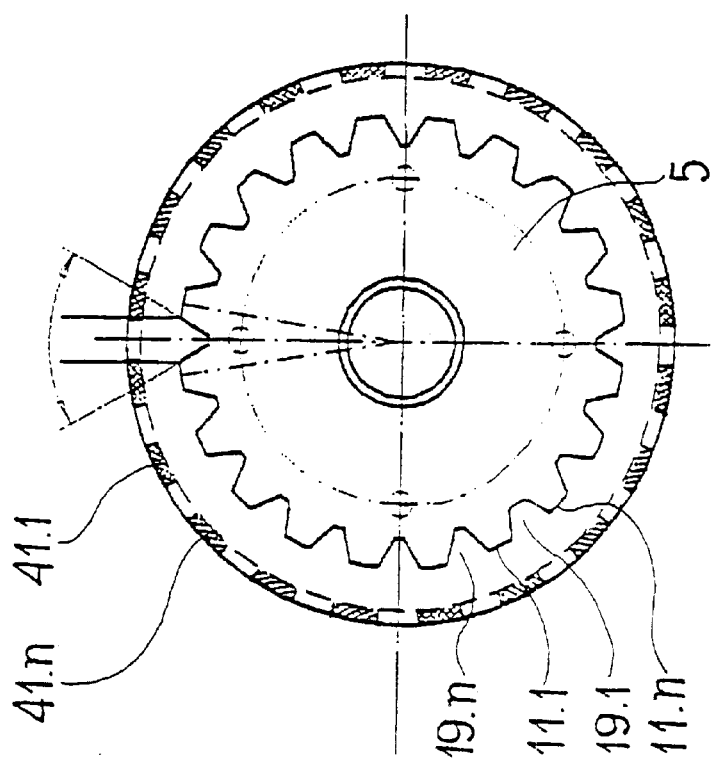
FIG. 4*a* is a schematic top view of a state-transmitting assembly for the latched switching devices illustrated in FIGS. 1*a* through 1*d*.

In FIG. 4*b*, shaft 5.1 extends into a finger-like projection 42.

Figure 1D:
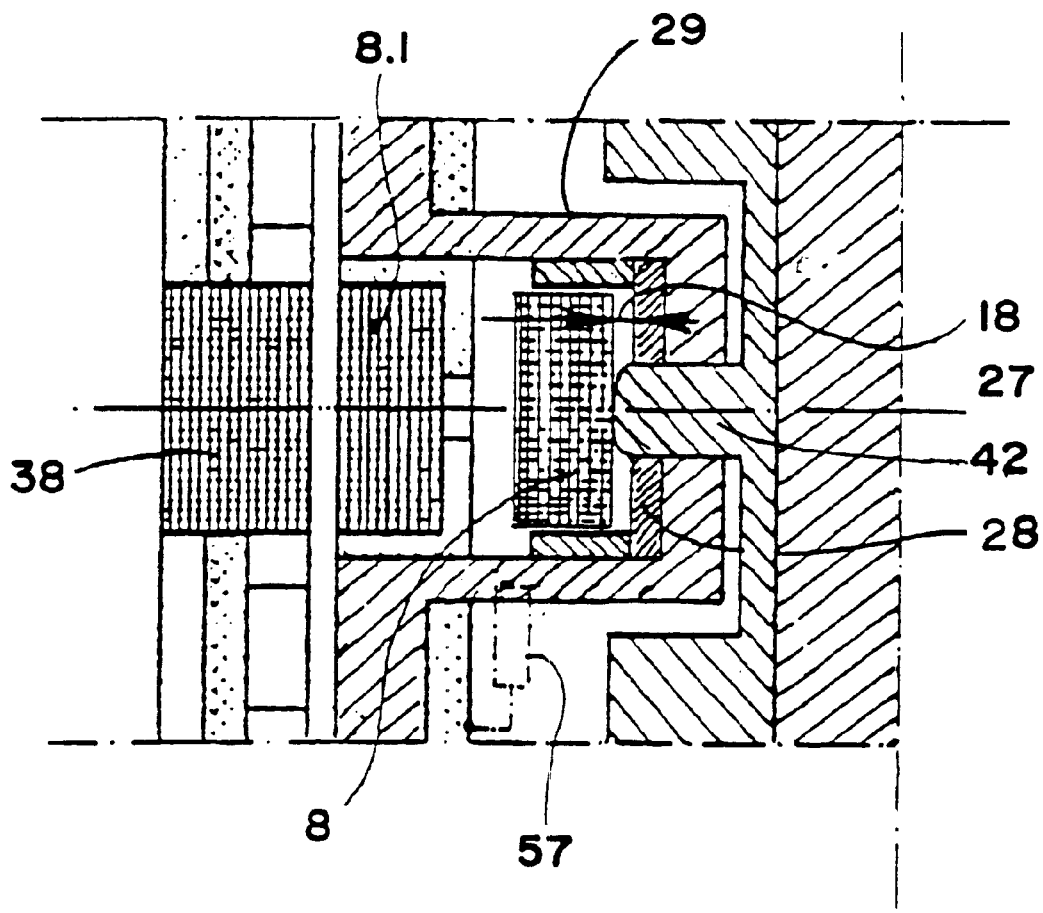

In FIG. 1*d*, a cutout in a sleeve 29 that is part of inner housing (not shown in FIG. 1*d*). Also in FIG. 1*d*, sleeve 29 is closed in the vicinity of projection 42 by a floor 27 with a component 28 of magnetically conductive material, specifically steel, iron, finely loaded plastic or the like. Accommodated below component 28 is a magnetic finger-touch switching component 8 that, since it is magnetized, constantly rests against component 28, such that finger-like projection 42 is always retained between component 28 and magnetic finger-touch switching component 8.

FIG. 1*b* shows the varying internal B3 between the cogs and gaps.

An attractive force $$F=(B^2 A)\mu_0$$

wherein

A is the total cross-section of an airgap constituted by the varying interval B3 between the cogs and the gaps, B is the induction at the airgap, and F0 is the constant of induction, will accordingly always prevail between the individual magnets represented by state-transmitting cogs 11.1, ..., 11.n and the cogs 44.1, ..., 44.n.

The same equation governs magnetic finger-touch switching component 8, which is positioned at a variable distance 18 or airgap from component 28.

The touch of position-information, state-transmitting assembly 1 as it is displaced along a longitudinal axis A, forces magnetic finger-touch switching component 8 away from magnetically conductive component 28. A force similar to that of a tensioned spring must be overcome. When a rotation around longitudinal axis A is transmitted to position-information, state-transmitting assembly 1, state-transmitting cogs 11.1, ..., 11.n will change position like individual magnets subject to cogs 44.1, ..., 44.n and to the four permanently magnetized components 44'.1, ..., 44'.n. The change in distance B3 will it turn vary the overall cross-section of the airgap and accordingly the magnetic force of the individual magnets.

Since the individual magnets are uniformly distributed along the cylindrical rotor in the form of state-transmitting cogs 11.1, ..., 11.n, they are arranged in the same position in relation to a single cog 44.1, ..., 44.n or permanently magnetized components 44.1', ..., 44.n'. Since the attractive force exerted by the individual magnets, state-transmitting cogs 11.1, ..., 11.n, that is, on cogs 44.1, ..., 44.n is at a maximum, position-information, state-transmitting assembly 1 will "click" into a fixed position in relation to position selecting assembly 2.

A change from one fixed position and into another is possible only by overcoming the multiple force of attraction. Since state-transmitting cogs 11.1, ..., 11.n are as wide as cogs 44.1, ..., 44.n, the position will be exact.

Of particular advantage is that the clicking in occurs without wear. Whether position-information, state-transmitting assembly 1 rotates clockwise or counterclockwise is of no significance in that no mechanical components are present that would require rotation in one direction, whereby every change in position would result in damage or destruction.

Once a particular position has been assumed, it can be further secured by magnetic finger-touch switching component 8. This feature is particularly significant when the click-in controls are intended to confirm a selection.

If the supply or electricity to coil 11 is interrupted or distorted, the four permanently magnetized components 44.1', ..., 44.n' will ensure that an established position is maintained even when force F of attraction is relatively weak. Figuratively, the click-in controls will discontinue functioning as illustrated in FIG. 1a and 1b and will begin to function in the simplest phase illustrated in FIG. 1c.

The rotation and possible depression of knob 30, wherein the outer housing 10 is provided with openings 14.1, ..., 14.n that connect the inner housing with an actuating button 30, will change the position of state-transmitting components 41.1, ..., 41.n between permanent-magnet components 6.1, ... 6.n and Hall sensors 60.1, ... 60.n (shown in FIGS. 3a and 3b, also known as state-detecting components). That these components face each other will be evident from FIGS. 3a and 3b, wherein Hall sensors 60.1, ..., 60.n are mounted on a disk 60 (FIG. 3b, which together form a state-indicating assembly) and separated a distance B2 (FIG. 3a) from state-transmitting components 41.1, ..., 41.n.

Back in FIG. 1b, inner housing 20 accommodates the magnetic components in the form of permanent-magnet components 6.1, ... 6.n of equal width and separated by equal gaps. Facing these components and also mounted on disk 60 are mutually separated Hall sensors 60.1, ..., 60.n. State-transmitting components 41.1, ..., 41.n move between permanent-magnet components 6.1, ... 6.n and Hall sensors 60.1, ..., 60.n. The Hall sensors convert the position of state-transmitting components 41.1, ..., 41.n into an electric signal for further processing. Another Hall sensor 57 (FIGS. 1a and 1d) faces magnetic finger-touch switching component 8 and detect its position, converting it as well into an electric signal for further processing.

The click-in controls illustrated in FIG. 1b can be augmented as illustrated in FIG. 1a with a base 4 and with a magnet holder 90 (FIG. 5a) mounted at least to some extent on an outer housing 10 (FIG. 1a) that surrounds inner housing 20.

In FIG. 1a, the inner housing 20 in the click-in controls can be enclosed in a wall with equally separated depressions 33 wherein four guide components in the form of balls 32.1–32.4 travel. A permanent magnet 8.1 is secured in the midst of depressions 33.

Figure 2:
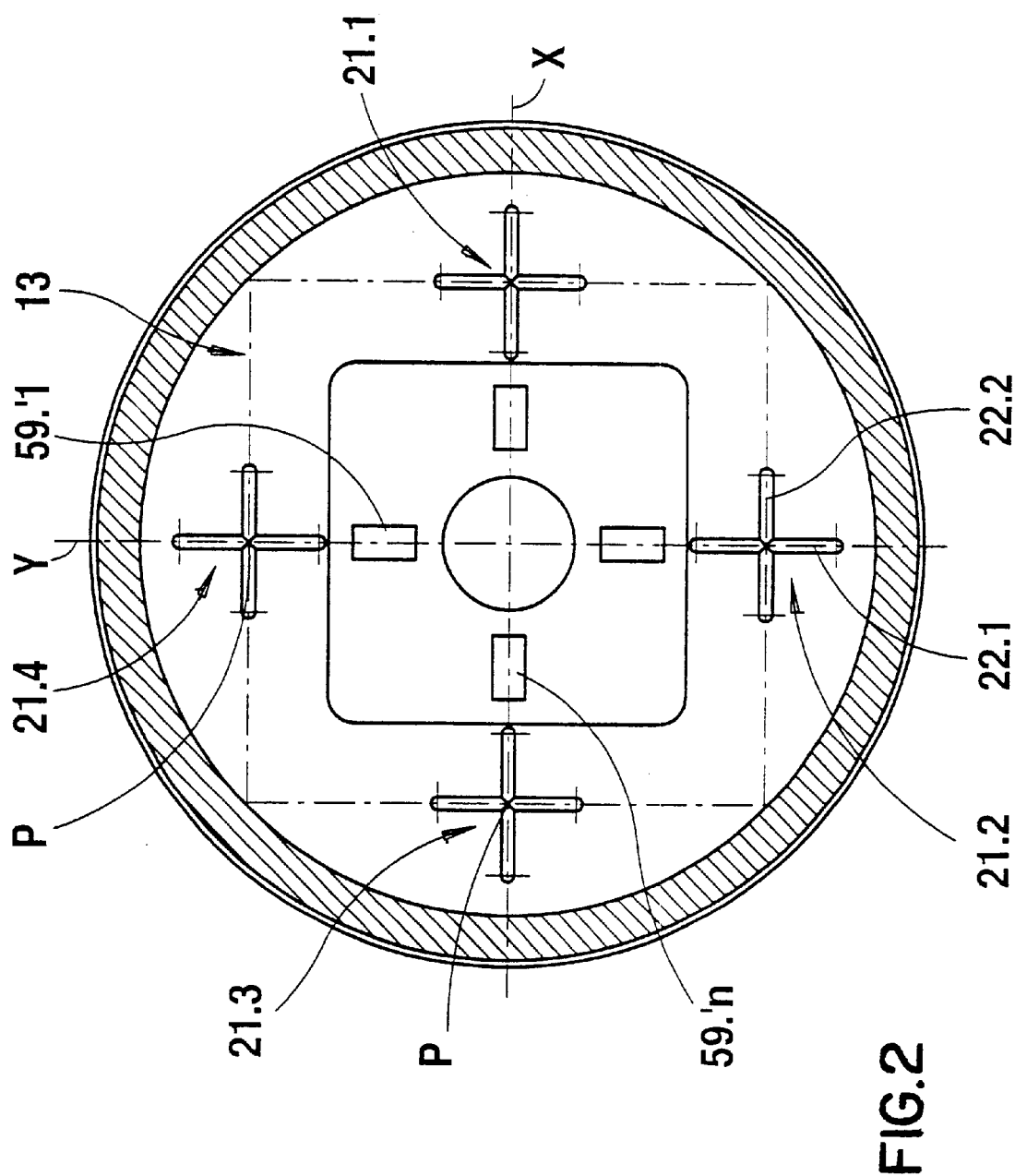

FIG. 2 is a top view of the base in conjunction with other components of the controls. Facing one another on its surface 13 are four components 21.1–21.4 in the form of at least two equally long grooves 22.1 and 22.2 that intersect at the center. Further such intersecting grooves are also possible. FIG. 2 illustrates, in addition to the two grooves 22.1 and 22.2, represented by the thick line, two further such grooves at 45 E to the first two and at 90 E to each other. The more grooves, the greater the degree of freedom of guide components 32.1–32.4 (FIG. 1a).

In FIG. 5a, if the click-in controls include another magnet holder 80, the floor of inner housing 20 (not shown in FIG. 5a) will be augmented with the configuration represented in FIG. 5a, and the housing will accordingly be closed by magnet holder 90 shaped as represented in FIG. 5b. At the center of magnet holder 90 is a permanent-magnet assembly.

FIG. 5b shows the permanent-magnetic assembly in the form of a Greek cross and consisting of an essential square magnet at the center with four arms in the form of permanent magnets 58.1–58.4, Each arm has a washboard-like surface of parallel ridges 55.1, ..., 55.n. The ridges are square in cross-section and are accordingly separated by rectangular depressions. System 58 need not be entirely of magnets, but can have a square magnet at the center and arms of a magnetically conductive material, especially iron.

Returning to FIG. 5a, the square magnet at the center of the system faces a permanent magnet 48 of the same shape in magnet holder 80. It is square and demarcated by a wall at each edge 48.1–48.n. The walls extend above the magnet. The smooth inner surface 83 of magnet holder 80 rests against a plane E1. At rest, inner surface 83 faces the toothing 55.1, ..., 55.n.

In FIG. 5b, Hall sensors 59.1, ..., 59.n are accommodated in an inner surface 56. These sensors detect the varied positions of permanent magnet 8.1 (shown in FIGS. 1a and 1d) and convert them into electric signals for further processing.

Figure 6:
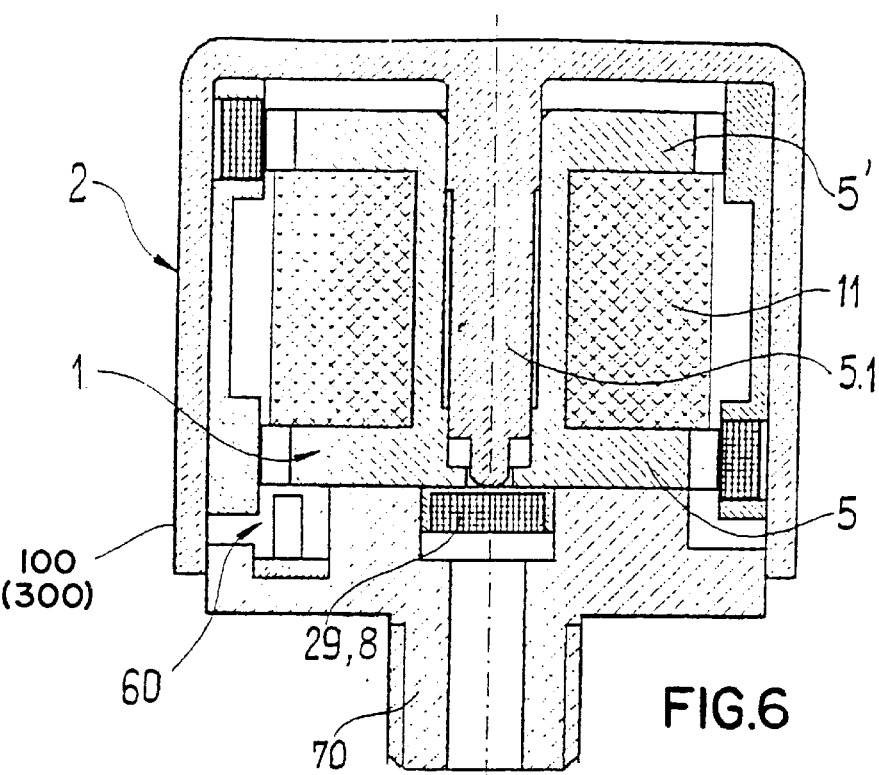
FIGS. 6 and 7 are schematic longitudinal sections through latched switching devices in the form of intelligent rotating knobs.
Figure 7:
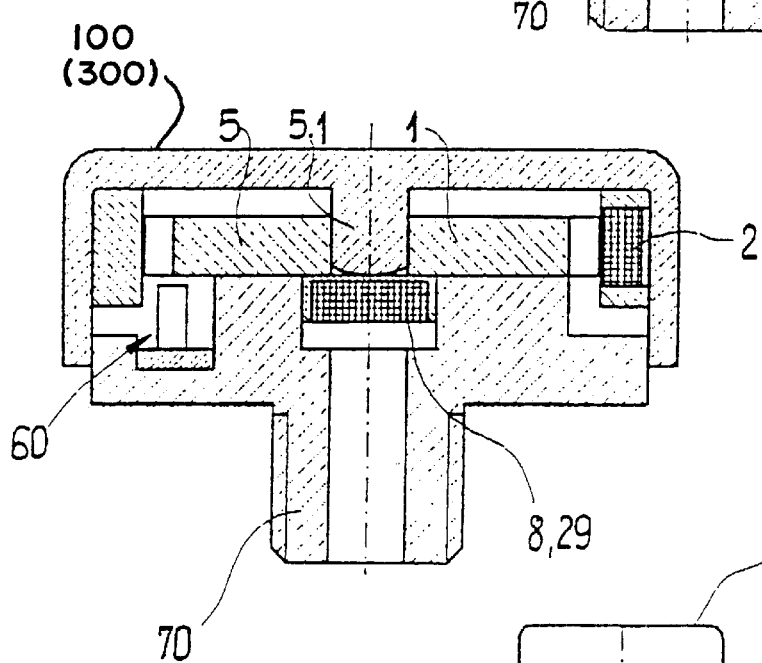

FIGS. 6 and 7 illustrate click-in controls in the form of an intelligent rotating knob. The rotor 5 in this embodiment is faced by another rotor 5' with similar cogs distributed around it. A coil 11 is accommodated between the two rotors. A shaft and a finger-like projection faces a magnetic finger-touch switching component 8 of the type hereintofore specified. The shaft merges seamlessly into a housing 100 that simultaneously constitutes both the knob and hence a position-information transmitting assembly 1. The particular positions are selected by a position-selection assembly of the type hereintofore specified.

In FIG. 7, click-in controls of this species can be considerably miniaturized. The housing 100 that accommodates the active components is considerably flatter than the housing illustrated in FIG. 6. What is essential to the present invention is that housing 100 simultaneously constitutes a control knob 300 and can be provided with the rough handling-facilitating surface in the form of groove etc. conventional for such structures.

FIGS. 8, 9, 10, 11, and 12 illustrate click-in controls of the regular type contemplated in this invention, but with a cardanic connection. Such controls can easily be integrated into a vehicle's displays or even into its steering wheel. It should be noted that the click-in controls in FIG. 8 extend only 1.3 cm out of the wall, whereas in FIG. 7, they extend out 3 cm.

Figure 8:
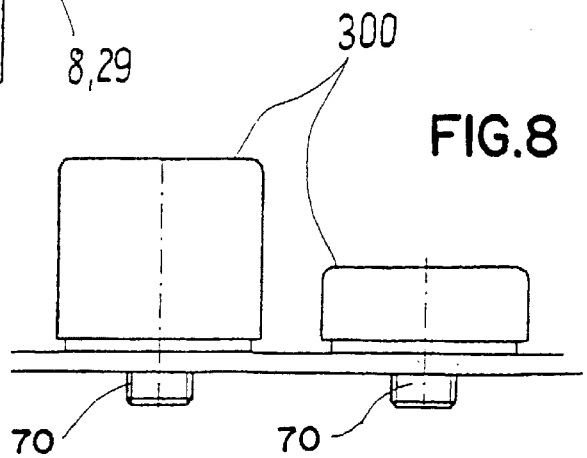
FIG. 8 is a drawing to scale of the intelligent rotating knobs illustrated in FIGS. 6 and 7.

FIG. 8 illustrates click-in controls in the form of an intelligent knob to scale. It has a threaded connection that can be screwed directly into a front wall.

Figure 9:
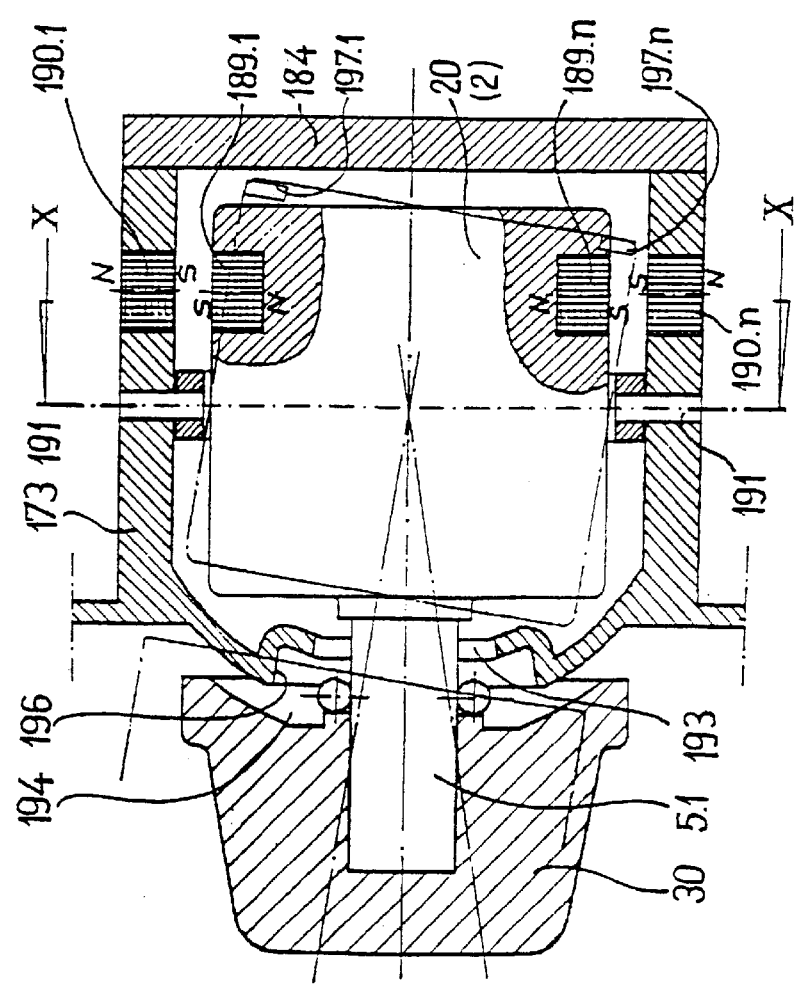
FIG. 9 is a schematic section through a cardanic version of the latched switching devices illustrated in FIG. 1*a* through 4*b* as accommodated in a housing assembly.
Figure 11:
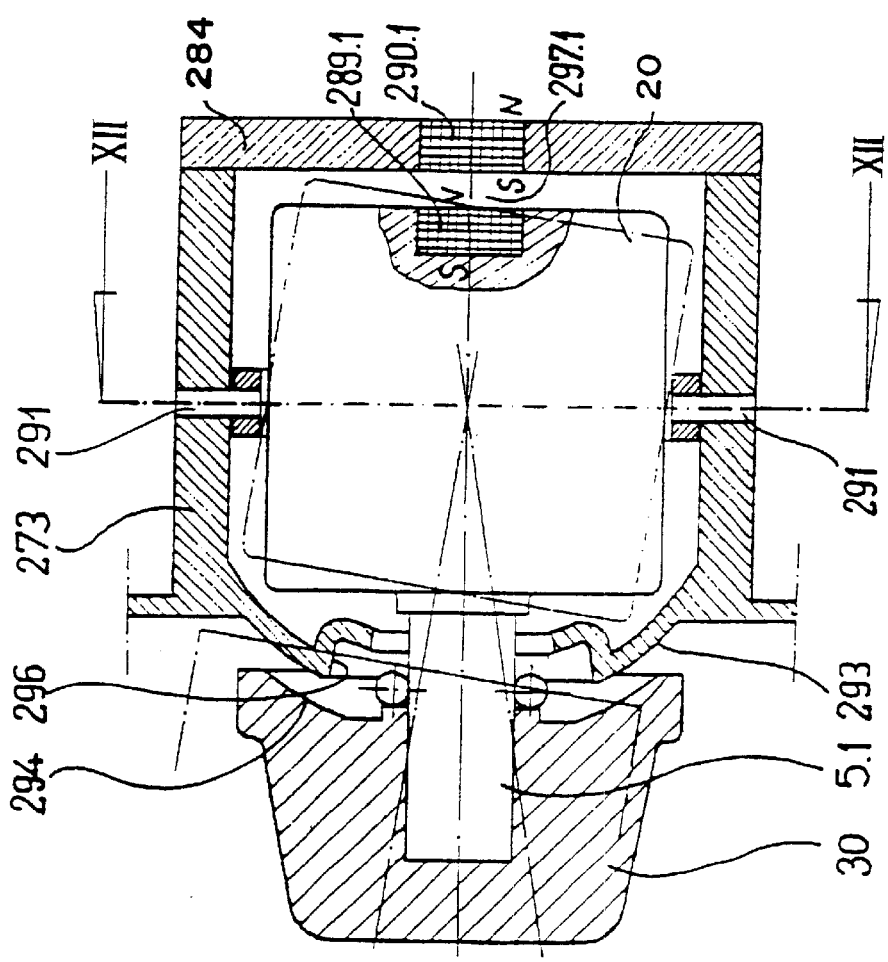
FIG. 11 is a schematic section through another cardanic version of the latched switching device illustrated in FIG. 1*a* and 1*b* as accommodated in a housing assembly.

In FIG. 9, shaft 5.1 definitely extends out of a tilting housing assembly 173 and 184, or 273 and 284 in FIG. 11 and is provided with an actuating knob 30.

The inner housing 20 that accommodates position-selecting assembly 2 (FIG. 10) rotates around two mutually facing shaft components 181 (FIG. 10) and 191 or 281 (FIG. 12) and 291 (FIG. 11) in a tilting housing 173 (FIG. 9) or 273 (FIG. 11). The result is a cardanic suspension.

Figure 10:
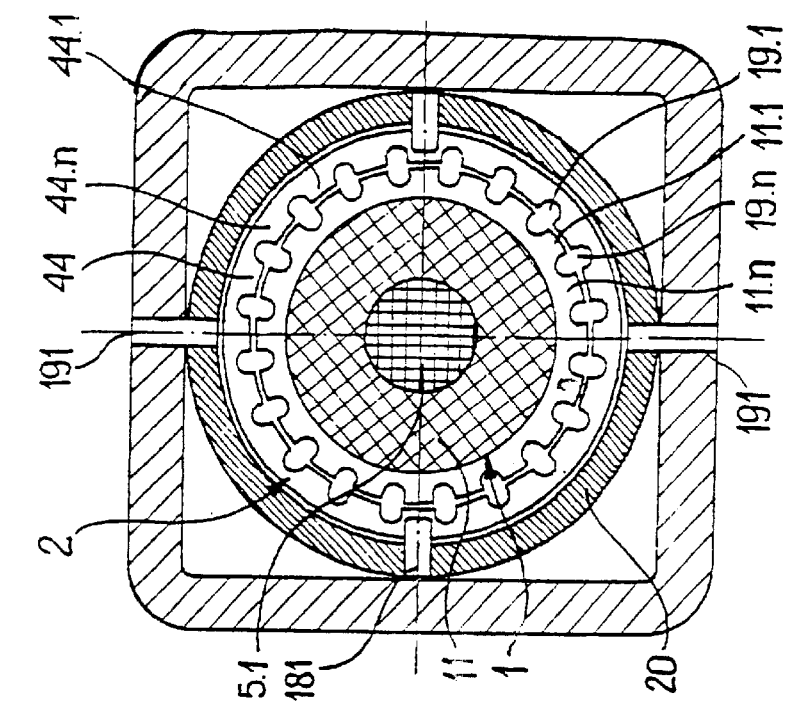
FIG. 10 is a section along the line X—X through the cardanic version illustrated in FIG. 9.
Figure 12:
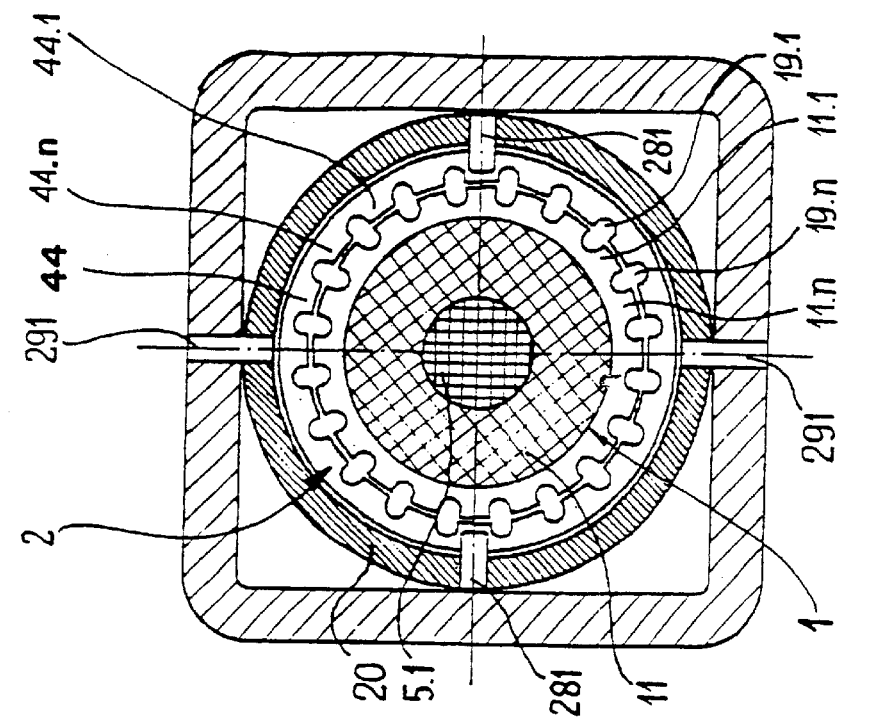
FIG. 12 is a section along the line XII—XII through a cardanic version of the latched switching device illustrated in FIG. 11.

FIGS. 10 and 12 show a position-information transmitting assembly 1 with its state-transmitting cogs 11.1, ..., 11.n and gaps 19,1, 19.2, ..., 19.n along with the coil 11 around shaft 5.1, Also represented is a position selecting assembly 2 along with crown wheel 44 and it cogs 44.1, ..., 44.n accommodated in inner housing 20.

FIGS. 9 and 11 show that tilting housing 173 (FIG. 9) or 273 (FIG. 11) is hollow and rectangular and closed at one end by a continuous hemisphere 193 (FIG. 9) or 293 (FIG. 11) that merges toward the center of the closure into a disk, through which shaft 5.1 extends.

The end of knob 30 facing tilting housing 173 (FIG. 9) or 273 (FIG. 11) is provided with hemispherical depressions 194 (FIG. 9) or 294 (FIG. 11) that match hemisphere 193 (FIG. 9) or 293 (FIG. 11). Knob 30 can accordingly slide around over the housing.

The open end of tilting housing 173 (FIG. 9) or 273 (FIG. 11) is closed by a lid 184 (FIG. 9) or 284 (FIG. 11).

Individual state-transmitting magnets 190.1, . . . , 190.n (FIG. 9) are accommodated in the mutually facing walls of the tilting housing 173 (FIG. 9). This housing accordingly assumes the function of an additional position-information transmitting assembly.

In the embodiment illustrated in FIG. 11, an individual position-information transmitting magnet 290.1 is accommodate in the cap 284 of a tilting housing 273. This housing accordingly assumes in conjunction with cap 284 the function of an additional position-information transmitting assembly.

Individual state-transmitting magnets 190.1, . . . , 190.n (FIG. 9) face individual magnets 189.1, . . . , 189.n (FIG. 9) or 289.1 (FIG. 11), which are accommodated in inner housing 20, at a variable distance inside. The individual magnet and the individual position-information transmitting magnets can be either permanent magnet or electromagnets.

In FIG. 9, the inner housing 20 accommodates not only individual magnets 189.1, . . . , 189.n but Hall sensors 197.1, . . . , 197.n that transmit precise and undisrupted information as to changes in the position of inner housing 20.

FIG. 11 illustrates a Hall sensor 297.1 in the vicinity of an individual magnet 289.1. This approach as well will provide information as to changes in the position of an individual magnet 289.1 in relation to that of an individual information-transmitting magnet 290.1 due to changes in the position of inner housing 20 in the form of an electric signal that can be further processed.

In FIG. 9, the specific arrangement of the magnets and their poles will always allow inner housing 20 to assume a well defined limiting or zero position. The cardanic suspension allow a joystick-like motion by way of knob 30 (only shown in FIGS. 9 and 11) .

FIG. 1a illustrates how the click-in controls operate.

In FIG. 1a, motion of knob 30 moves the guide components in the form of balls 32.1–32.4 along the grooves 22.1 and 22.2 (FIG. 2) in the intersecting components 21.1–21.4 (FIG. 2), establishing a state as is done with a joystick. The particular state assumed is detected by the changed position of permanent magnet 8.1 in relation to Hall sensor 59'.1, . . . , 59'.n (FIG. 2) and transmitted to a computer in the form of an electric signal. Such a procedure could for example select and display a programmable radio receiver.

Knob 30 is now rotated, rotating position-information transmitting assembly 1 around the axis A of the shaft. If the cogs on position-information transmitting assembly 1 now face those on the position-selecting assembly, the force of attraction exerted by coil 11 will retain rotor 5 in its current position. This approach will allow the various stations in that particular band to be discontinuously tuned in with the aid of the Hall elements 60.1 (FIGS. 1b and 1c, 3a and 3b) and their names and frequencies to be displayed.

Of particular interest to drivers in this context are stations that transmit information about traffic conditions, icy roads, etc. A direct selection of stations that cover the particular area the vehicle is being driven in is particularly desirable.

A particular station can be selected by pressing down on knob 30 along axis A, whereby finger-like projection 42 will separate magnetic finger-touch switching component 8 from magnetically conductive component 28. This pressure will be limited by the play of second rotor 40. The changed position of magnetic finger-touch switching component 8 will be detected by Hall sensor 57 (FIG. 1a), and the result electric signal will be acknowledged by the computer as a confirmation, locking in the selected station.

Once the pressure has been accommodated by knob 30, component 28 will again be attracted by magnetic finger-touch switching component 8 and will force position-information transmitting assembly 1 back into its original position. The combination of magnetic finger-touch switching component and magnetically conductive component 28 replaces the conventional spring. The advantage here that such a combination cannot malfunction or break like a spring.

Releasing the knob will also slide permanent magnet 8.1 over permanent magnet 38 and into its original position-Position-information transmitting assembly 1 on the other hand will maintain its rest position and, if a station goes dead or out of tune, it can be called up again just by advancing knob 30 accompanied by the regular confirmation.

Moving knob 30 in another direction will establish a different basic program that can for example sort through displayed addresses when the knob is rotated around axis A and acknowledge or select one address when the knob is advanced along the axis. These address are not only displayed on the screen but, once selected, can provide a particular function like maintaining constant speed.

Of particular advantage is that the click-in controls specified herein can be manufactured in the dimensions represented in FIG. 8, taking advantage of restricted space.

There has thus been shown and described a novel latched switching device which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Discontinuous state selector apparatus intended for operating in-vehicle computers, washing machines, bicycle derailleurs, personal computers, computer games, navigational systems and the like, said apparatus comprising, in combination:

(a) a state-transmitting assembly that includes a shaft with a first cylindrical rotor mounted thereon, said first rotor having radial state-transmitting cogs separated by state-transmitting gaps distributed around its circumference and a second cylindrical rotor having at least one state-transmitting component distributed around its circumference, said second rotor being connected to said first rotor on a common longitudinal axis;

(b) a first state-selecting assembly surrounding and arranged substantially coaxially with said first rotor and comprising a crown wheel with cogs pointing radially inward and separated by gaps, said crown wheel incorporating at least one permanently magnetized component which acts in conjunction with said cogs to control rotation of said first rotor; and (c) a first state-indicating assembly having at least one first state-detecting component for producing electronic signals representing an angular position of said state-transmitting assembly;

whereby said state-transmitting assembly is operative to rotate about said longitudinal axis, transmitting the positions of said state-transmitting component, so that electronic signals, representing said angular position, may be produced by said at least one first state-detecting component.

2. The discontinuous state selector apparatus as in claim 1, said apparatus further comprising, in combination:
   (a) a magnetically biased projection extending coaxially on said second rotor;
   (b) a second state-selecting assembly with a cutout for the projection to extend through; and
   (c) a second state-indicating assembly with at least one second state-detecting component for producing electronic signals representing the respective longitudinal position of said first and second rotor;
   wherein said state-transmitting assembly is displaced along the longitudinal axis with the projection on said second rotor, resting said second rotor near said second state-selecting assembly, and wherein this position is detectable by said second state-detecting component,
   whereby selection states are augmented in two dimensions, said selection states being determined without being contacted or disturbed, and are in the form of electrical signals for further processing.

3. A discontinuous state selector as in claim 2, wherein the second state-selecting assembly comprises a permanent magnetic finger-touch switching component accommodated in a bushing on a ferritic base and constituting the second state-indicating assembly, changes in the state of which can be detected by the second state-indicating assembly in the form of a second hollow component.

4. A discontinuous state selector as in claim 2, wherein the permanent magnetic finger-touch switching component, when magnetically attracted to the ferritic base, applies a force to the state-transmitting assembly inside the bushing by means of the projection.

5. The discontinuous state selector apparatus as in claim 1, said apparatus further comprising, in combination:
   (a) a base having a planar surface normal to said longitudinal axis with a first permanent magnet mounted on said surface facing the state-transmitting assembly;
   (b) a housing partially enclosing said state-transmitting assembly and having a wall possessing a second permanent magnet at least partially facing said first permanent magnet; and
   (c) said base further comprising a third state-indicating assembly with at least one third state-detecting component for producing electronic signals representing the lateral position of said state transmitting assembly; said housing partially enclosing
   whereby said housing partially enclosing said state-transmitting assembly cat be moved in two dimensions over said third state-indicating assembly and its position can be detected by said third state-detecting component.

6. A discontinuous state selector as in claim 5, wherein said base has four intersecting components on the surface normal to said longitudinal axis and facing the second state-transmitting assembly, wherein the intersecting components are situated in pairs along axes that constitute a coordinate system,
   wherein each intersecting component is a groove in said base with the point of intersection and with one of the grooves in the associated coordinate axis, and
   wherein an inner housing that accommodates at least the state-transmitting assembly and the first state indicating assembly, with a wall that faces the base and parallels the surface and is provided with guide components that are equal intervals apart, extend above the wall, and can be displaced within the intersecting component.

7. A discontinuous state selector as in claim 6, wherein the guide components are balls that travel in a depression in the wall of the inner housing.

8. A discontinuous state selector as in claim 5, wherein said base is part of an outer and preferably cylindrical housing that at least partially incorporates the inner housing.

9. A discontinuous state selector as in claim 8, wherein said outer housing is provided with opening in the wall facing the base that accommodates connectors that connect the inner housing with a knob for manual actuation.

10. A discontinuous state selector as in claim 5, wherein said bass comprises a plurality of permanent magnets that form a system of coordinates incorporated into a magnet holder such that said permanent magnets in said coordinate system are mounted in pairs along each axis of the coordinate system and are in contact with the external surface of said wall possessing said second permanent magnet.

11. A discontinuous state selector as in claim 5, wherein the third state-indicating assembly is at least partly constituted by the second permanent magnets, changes in the state of which can be detected by the third state-detecting component in the form of a third Hall sensor.

12. A discontinuous state selector as in claim 1, wherein said shaft and said first cylindrical rotor are made of magnetically conductive material.

13. A discontinuous state selector as in claim 1, wherein said shaft and said first cylindrical rotor are in one integral piece.

14. A discontinuous state selector as in claim 1, further comprising a magnetizing assembly comprising at least one coil positioned adjacent said shaft and said first rotor for applying a magnetic flux to said state-transmitting cogs.

15. A discontinuous state selector as in claim 1, wherein said first state-indicating assembly is a slide with a first Hall sensor mounted on it and facing at least one permanent-magnet assembly with the state-transmitting components constituting magnetically conductive tabs mounted at intervals on the second rotor and that can be moved around and secured between the Hall sensor and the permanent-magnet assembly.

16. A discontinuous state selector as in claim 5, wherein one end of said shaft is provided with an actuating button.

17. A discontinuous state selector as in claim 9, wherein said actuating button includes a bowl that facilitates maneuvering.

* * * * *